US012460067B2

United States Patent
Garbey et al.

(10) Patent No.: US 12,460,067 B2
(45) Date of Patent: Nov. 4, 2025

(54) PROCESS FOR THE PREPARATION OF MODIFIED SILICA, MODIFIED SILICA AND ITS USES

(71) Applicant: RHODIA OPERATIONS, Lyons (FR)

(72) Inventors: Pascaline Garbey, Saint Didier Au Mont d'Or (FR); Philippe Marion, Vernaison (FR); Matthieu Corbet, Vourles (FR); Frédéric Colbeau-Justin, Leuville-sur-Orge (FR); Thomas Galeandro-Diamant, Villeurbanne (FR)

(73) Assignee: RHODIA OPERATIONS, Lyons (FR)

( * ) Notice: Subject to any disclaimer, the term of this patent is extended or adjusted under 35 U.S.C. 154(b) by 713 days.

(21) Appl. No.: 17/722,188

(22) Filed: Apr. 15, 2022

(65) Prior Publication Data

US 2022/0235200 A1     Jul. 28, 2022

Related U.S. Application Data

(63) Continuation of application No. PCT/EP2020/078534, filed on Oct. 12, 2020.

(30) Foreign Application Priority Data

Oct. 15, 2019  (EP) .................................. 19306339

(51) Int. Cl.
  *C08K 9/06* (2006.01)
  *C08L 25/10* (2006.01)

(52) U.S. Cl.
  CPC ............... *C08K 9/06* (2013.01); *C08L 25/10* (2013.01)

(58) Field of Classification Search
  CPC ... C08K 9/06; C08K 9/04; C08K 5/13; C08K 3/36; C08L 25/10; B06C 1/00; B06C 1/0016
  See application file for complete search history.

(56) References Cited

U.S. PATENT DOCUMENTS

| | | | |
|---|---|---|---|
| 5,403,570 | A | 4/1995 | Chevallier et al. |
| 5,846,506 | A | 12/1998 | Esch et al. |
| 5,876,494 | A | 3/1999 | Bomal et al. |
| 5,882,617 | A | 3/1999 | Chevallier et al. |
| 5,977,212 | A | 11/1999 | Ebner et al. |
| 6,107,226 | A | 8/2000 | Chevallier |
| 6,169,135 | B1 | 1/2001 | Chevallier et al. |
| 6,180,076 | B1 | 1/2001 | Uhrlandt et al. |
| 6,268,424 | B1 | 7/2001 | Blume et al. |
| 2003/0066459 | A1 | 4/2003 | Bomal et al. |
| 2003/0118500 | A1 | 6/2003 | Chevallier et al. |
| 2004/0062701 | A1 | 4/2004 | Valero et al. |
| 2005/0032965 | A1 | 2/2005 | Valero |
| 2011/0178227 | A1 | 7/2011 | Allain et al. |
| 2013/0156674 | A1 | 6/2013 | Guy et al. |

FOREIGN PATENT DOCUMENTS

| | | |
|---|---|---|
| CN | 104650420 A | 5/2015 |
| CN | 107641229 A | 1/2018 |
| EP | 0396450 A1 | 11/1990 |
| EP | 0520862 A1 | 12/1992 |
| EP | 0647591 A1 | 4/1995 |
| EP | 0901986 A1 | 3/1999 |
| EP | 0762992 B1 | 1/2000 |
| EP | 0762993 B1 | 1/2000 |
| EP | 0983966 A1 | 3/2000 |
| EP | 0670814 B1 | 12/2001 |
| EP | 0670813 B1 | 3/2003 |
| EP | 0917519 B1 | 7/2003 |
| EP | 1355856 B1 | 8/2015 |
| WO | 9509128 A1 | 4/1995 |
| WO | 03016215 A1 | 2/2003 |
| WO | 2009112458 A1 | 9/2009 |
| WO | 2011117400 A1 | 9/2011 |
| WO | 2018089421 A1 | 5/2018 |

OTHER PUBLICATIONS

Kamegawa, "Graphene Coating of TiO2 Nanoparticles Loaded on Mesoporous Silica for Enhancement of Photocatalytic Activity," 2010, J. Phys. Chem. C, 114, 15049-15053 (Year: 2010).*
Nishihara, "Carbon-coated mesoporous silica with hydrophobicity and electrical conductivity," 2008, Carbon, 48-53 (Year: 2008).*
Filonenko, "Sorption and electrochemical properties of carbon-silica composites and carbons from 2,3-dihydroxynaphthalene," 2015, J. Porous Mater., 22, 21-28 (Year: 2015).*
Suvithaindian, "Effective synthesis of hexacoordinate silicates of 2,3-dihydroxynaphthalene under microwave condition and x-ray crystal structure of bis(tri-n-butylammonium)tris(2,3-dihydroxynaphthalato)silicate," 2006, Journal of Chemistry, 45A, 2193-2198 ( Year: 2006).*
International Search Report issued in corresponding International Application No. PCT/EP2020/078534; mailed Feb. 5, 2021 (3 pages).
Written Opinion of the International Searching Authority issued in corresponding International Application No. PCT/EP2020/078534; dated Feb. 5, 2021 (5 pages).

* cited by examiner

*Primary Examiner* — Robert S Jones, Jr.
*Assistant Examiner* — Joshua Caleb Bledsoe
(74) *Attorney, Agent, or Firm* — Osha Bergman Watanabe & Burton LLP

(57) ABSTRACT

A modified silica comprising organic molecules absorbed on the surface of a precipitated silica is provided. The modified silica is particularly suitable for use as filler in elastomeric mixtures as it provides improvement in the processing of the silica/elastomer mixtures. A process for preparing the precipitated silica is also provided.

9 Claims, No Drawings

PROCESS FOR THE PREPARATION OF MODIFIED SILICA, MODIFIED SILICA AND ITS USES

This application is a continuation of PCT application no. PCT/EP2020/078534 filed on Oct. 12, 2020, which claims priority to European application No. 19306339.3 filed on Oct. 15, 2019, the whole content of all these applications being incorporated herein by reference for all purposes.

TECHNICAL FIELD

The present invention relates to a process for the preparation of modified silica, to the modified silica and to its applications. In particular, the present invention relates to a precipitated silica comprising organic modifiers.

BACKGROUND

Silica has long been used as reinforcing filler in polymeric materials and, in particular, in elastomers.

It has now been found that the modification of silica, in particular precipitated silica, with certain organic molecules improves the use of said precipitated silica in polymeric compositions.

It has now been found that modified silicas according to the present invention are easier to mix with elastomers allowing an improved process for the preparation of elastomeric compositions having well dispersed silica.

DETAILED DESCRIPTION

A first object of the present invention is a modified precipitated silica comprising at least one compound, hereinafter referred to as "compound (A)", selected from the group consisting of the compounds of formula (I):

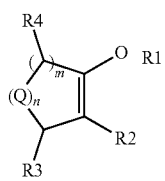
(I)

wherein:
R1 is selected from the group consisting of H and optionally substituted, saturated or partially unsaturated, C1-C5 hydrocarbon radicals;
R2 is selected from the group consisting of R1, —COOH, —COOR1, —OR1;
R3 and each of R4 are selected, independently of each other, from the group consisting of —H, —OR5, —CHO, =O, —COOR5, R6; wherein R5 is selected from the group consisting of H, saturated or partially unsaturated C1-C75 hydrocarbon radicals, optionally substituted with heteroatoms selected from halogen, P, S, N, O and Si, or which can be fused together to form one or more aromatic or aliphatic cycle, and R6 is selected from the group of optionally substituted, saturated or partially unsaturated, C1-C75 hydrocarbon radicals, preferably C3-C40 hydrocarbon radicals, more preferably C3-C12 hydrocarbon radicals, even C4-C8 hydrocarbon radicals, optionally substituted with heteroatoms selected from halogen, P, S, N, O and Si, or which can be fused together to form one or more aromatic or aliphatic cycle; —SO$_3$X,
wherein X is H, Na, or K;
m is equal to 0, 1, 2, 3, 4 or 5;
n is 0, 1 or 2;
Q is an heteroatom selected from the group consisting of O, N, S;
wherein the ring may contain additional unsaturations or have aromatic character.

Possibly, the compounds of formula (I) are such that:
when Q is O, n=m=1, R4 is =O (carbonyl), and R3 is R6, then R6 is selected from the group of optionally substituted, saturated or partially unsaturated, C3-C75 hydrocarbon radicals, preferably C3-C40 hydrocarbon radicals, more preferably C3-C12 hydrocarbon radicals, even C4-C8 hydrocarbon radicals, optionally substituted with heteroatoms selected from halogen, P, S, N, O and Si, or which can be fused together to form one or more aromatic or aliphatic cycle; —SO$_3$X, wherein X is H, Na, or K;

when n=0, m=3 and the ring has aromatic character, then:
R2, R3, and R4 are not simultaneously —OH;
when R1=H and R2 or R4 in the ortho position with respect to —OR1 is equal to —OH, then R3=R6 is selected from the group of optionally substituted, saturated or partially unsaturated, C3-C12 hydrocarbon radicals, preferably C3-C10 hydrocarbon radicals, more preferably C4-C8 hydrocarbon radicals, optionally substituted with heteroatoms selected from halogen, P, S, N, O and Si, or which can be fused together to form one or more aromatic or aliphatic cycle; —SO$_3$X, wherein X is H, Na, or K;
when R1=H, then R2 and R4 cannot be simultaneously —OH or a C4 hydrocarbon radical.

In formula (I):
R1 is preferably selected from the group consisting of H or the C1-C3 hydrocarbon radicals, R1 is more preferably H or methyl; and
R2 is preferably selected from the group consisting of —OH, —COOH, —OCH$_3$, —C(CH$_3$)$_3$;
Q is preferably O; and
n is 0 or 1.

In one embodiment of the invention, compounds of formula (I) contain unsaturated C—O bonds (=O). Notable non-limiting examples of said compounds are for instance: squaric acid (wherein n=0; m=1 and both R3 and R4 are =O); croconic acid (wherein n=0; m=2 and each R3 and R4 is =O); rhodizonic acid (wherein n=0; m=3 and each R3 and R4 is =O; tetrahydroxy-1,4-quinone (wherein n=0; m=3 and R3 and R4 in the para position are =O and R4 in the remaining positions are —OH).

In a second, preferred, embodiment of the invention the compounds of formula (I) are aromatic compounds of formula (II):

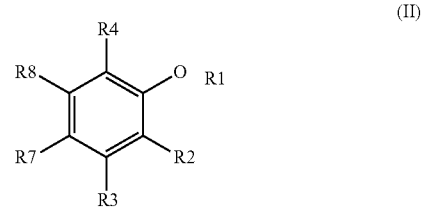
(II)

wherein R1, R2, R3 and R4 have the meaning provided above; and R7 and R8 are selected, independently of each other, from the group consisting of H, —OH, —OR5, —CHO, =O, —COOR5, R6, wherein R5 and R6 have the meaning provided above; and wherein R7 and R8 can be fused together to form one or more aromatic or aliphatic cycle.

In formula (II):
R1 is preferably selected from the group consisting of H or the C1-C3 hydrocarbon radicals; R1 is more preferably H or methyl;
R2 is preferably selected from the group consisting of —OH, —COOH, —OCH$_3$, —C(CH$_3$)$_3$;
R3 is preferably selected from the group consisting of —H, —OH, —SO$_3$X, wherein X is H, Na or K;
R4 is preferably selected from the group consisting of H, —OR5, —CH$_2$CH=CH$_2$, —C(CH$_3$)$_3$;
R7 is preferably selected from the group consisting of —CH=CH—COOR5, —CH$_2$CH=CH$_2$, —CH=CH—H$_3$; —C(CH$_3$)$_3$,
R8 is preferably selected from the group consisting of —H, —CHO, —COOR5, —CH=CH—COOR5, —CH$_2$CH$_2$NH$_2$, —SO$_3$X, wherein X is H, Na or K; and
R5 is preferably selected from H or the group consisting of saturated or partially unsaturated, C1-C75 hydrocarbon radicals, optionally substituted with O atoms, or which can be fused together to form one or more aromatic or aliphatic cycles, in particular containing monosaccharide units.

Possibly, the compounds of formula (II) comply with the proviso that:
R2, R3, and R4 are not simultaneously —OH;
when R1=H and R2 or R4 in the ortho position with respect to —OR1 is equal to —OH, then R3=R6 is selected from the group of optionally substituted, saturated or partially unsaturated, C3-C12 hydrocarbon radicals, preferably C3-C10 hydrocarbon radicals, more preferably C4-C8 hydrocarbon radicals, optionally substituted with heteroatoms selected from halogen, P, S, N, O and Si, or which can be fused together to form one or more aromatic or aliphatic cycle; —SO$_3$X, wherein X is H, Na, or K; and
when R1=H, then R2 and R4 cannot be simultaneously selected from —OH or a C4 hydrocarbon radical.

In an advantageous embodiment, R7 and R8 in formula (II) are fused together to form one or more aromatic cycle, preferably one aromatic 6 membered cycle.

Notable non-limiting examples of suitable compounds of formula (II) are for instance veratrole, guaiacol, 4-methyl-catechol, salicylic acid, eugenol, isoeugenol, gallic acid and its derivatives, caffeic acid, tiron, chlorogenic acid, protocatechuic aldehyde, protocatechuic acid, 2,3-dihydroxynaphthalene, hydroxychavicol, para- or ortho-allylcatechol or mixtures thereof, para- or ortho-allylguaiacol or mixtures thereof, 4-t-butyl-catechol, betanine.

Preferably compounds of formula (II) are selected from the group consisting of veratrole, guaiacol, 4-methyl-catechol, salicylic acid, gallic acid and its derivatives, caffeic acid, tiron, chlorogenic acid, protocatechuic aldehyde, protocatechuic acid, 2,3-dihydroxynaphthalene, hydroxychavicol, para- or ortho-allylcatechol or mixtures thereof, para- or ortho-allylguaiacol or mixtures thereof, 4-t-butyl-catechol, betanine.

In general, the modified silica of the invention exhibits, on its surface, molecules of the at least one compound (A) of formula (I).

The modified silica according to the invention exhibits a total content (C) of the at least one compound (A), expressed as total carbon, of at least 0.1 wt %, in particular of at least 0.2 wt %. The content (C) of the at least one aromatic compound can be of at least 0.5 wt %, in particular of at least 0.8 wt %, for example of at least 1.0 wt %, indeed even of at least 1.2 wt %. The content (C) the at least one aromatic compound, expressed as total carbon is not particularly limited, although it typically does not exceed 20.0 wt %, in particular it does not exceed 15.0 wt %.

The presence of the at least one compound (A) in the modified silica may be determined, for instance, by extracting the compound with a suitable solvent and then performing routine analysis on the extract (e.g. by NMR).

The expression "silica" is used herein to refer to silicon dioxide, SiO$_2$. The term "silica" is used throughout the text to refer to precipitated silica. The expression "precipitated silica" is used to refer to a synthetic amorphous silica obtained by a process wherein a silicate is reacted with an acid.

The modified silica typically has a BET surface area of at least 45 m$^2$/g, in particular of at least 50 m$^2$/g and preferably of at least 55 m$^2$/g. In some embodiments, the BET surface area may be even of at least 70 m$^2$/g, preferably of at least 80 m$^2$/g, and more preferably of at least 100 m$^2$/g.

The BET surface area generally is at most 700 m$^2$/g, generally at most 550 m$^2$/g, in particular at most 400 m$^2$/g, and even at most 370 m$^2$/g.

In some embodiments, the BET surface area is between 50 m$^2$/g and 400 m$^2$/g, preferably between 55 and 350 m$^2$/g. The BET surface area is determined according to the Brunauer-Emmett-Teller method described in The Journal of the American Chemical Society, Vol. 60, page 309, February 1938, and corresponding to the standard NF ISO 5794-1, Appendix D (June 2010).

In general, the modified silica has a CTAB surface area of between 40 and 650 m$^2$/g, in particular between 65 and 450 m$^2$/g. In some embodiments, CTAB surface area may be greater than 70 m$^2$/g. The CTAB surface area can in particular be between 70 and 200 m$^2$/g, for example between 120 and 190 m$^2$/g. The CTAB surface area can be determined according to the standard NF ISO 5794-1, Appendix G (June 2010).

A second object of the present invention is a process for the preparation of the modified silica.

In a first embodiment, the process for the preparation of the modified silica comprises the steps of:
providing a precipitated silica; and
adsorbing at least one compound (A) of formula (I) as defined above on said precipitated silica.

Any silica may be used in the inventive process. Mention may be made for instance of the following commercially available precipitated silicas: Zeosil® 1165MP, Zeosil® 1115MP, Zeosil® Premium 200MP, Zeosil® 1085GR, Zeosil® 195HR, Zeosil® 165GR, Zeosil® 115GR, Zeosil® HRS 1200MP, Zeosil® 195GR, Zeosil® 185GR, Zeosil® 175GR, Zeosil® 125GR (all commercially available from Solvay), Ultrasil® 5000GR, Ultrasil® 7000GR, Ultrasil® 9000GR, Ultrasil® VN3GR, Hi-Sil® EZ 160G-D, Hi-Sil® EZ 150G, Hi-Sil® 190G, Hi-Sil® 200G-D, Hi-Sil® HDP-320G, Hi-Sil® 255CG-D, Zeopol® 8755LS, Zeopol® 8745, Newsil® 115GR, Newsil® 2000MP, Tokusil® 315.

The silica may be in any form, such as a powder, granules, or substantially spherical beads.

According to the process of the invention at least one compound (A) is adsorbed on the silica as above defined. Adsorption may be carried out according to any means known in the art.

Adsorption may be obtained by impregnating granules or beads of the silica with the at least one compound (A) in the liquid or molten state. Alternatively, the at least one compound (A) may be in a form in which it is dispersed or dissolved in a suitable liquid carrier.

The step of impregnating the granules or beads with the at least one compound (A) may be carried out using any suitable equipment. For instance, the liquid or molten compound (A), its dispersion or its solution may be sprayed onto the silica maintained under suitable agitation. A mixer or an internal blender of the Brabender type may be used for the impregnation.

After the liquid or molten compound (A), its dispersion or its solution, has been contacted with the silica, drying may be optionally carried out. Drying may be particularly advantageous when the at least one compound (A) is in the form of a dispersion or solution in a liquid carrier, either aqueous or organic. In this latter case, the solvent is typically removed by evaporation.

In some embodiments, no drying step is performed and the liquid carrier, typically an organic one, may remain in the silica. Notable non-limiting examples of liquid carriers suitable for this purpose are for instance high boiling point organic compounds.

At the end of the process, at least one compound (A) is adsorbed on the precipitated silica.

In a second embodiment, the process for the preparation of the modified silica comprises the steps of:
  providing a precipitated silica; and
  mixing at least one compound (A) of formula (I) as defined above with said precipitated silica.

In this second embodiment of the process, the at least one compound (A) is in solid form and it is dry blended with the precipitated silica. The mixture thus obtained may be subjected to a thermal treatment to promote the melting of the at least one compound (A).

In a further embodiment, the process for the preparation of the modified silica comprises the steps of:
  reacting at least one silicate with at least one acid, to provide a silica suspension;
  submitting said silica suspension to filtration to provide a filter cake;
  submitting said filter cake to a liquefaction step to obtain a suspension of precipitated silica;
  adding at least one compound (A) to the filter cake before, during or after the liquefaction step;
  optionally, drying the suspension of precipitated silica obtained after the liquefaction step to obtain precipitated silica.

Several methods can be employed for the precipitation of silica: notably, the addition of an acid to a sediment of the silicate, or simultaneous addition, partial or total, of an acid and of the silicate to water or to a silicate sediment already present in the vessel.

The term "silicate" is used herein to refer to one or more than one silicate which can be added during the course of the inventive process. The term "silicate" is used herein to refer to a compound selected from the group consisting of the alkali metal silicates. Advantageously it is selected from the group consisting of sodium and potassium silicate.

In the case where sodium silicate is used, the latter generally has a $SiO_2/Na_2O$ weight ratio of between 2.0 and 4.0, in particular between 2.4 and 3.9, for example between 3.1 and 3.8.

The silicate may have a concentration (expressed in terms of $SiO_2$) of between 3.9 wt % and 25.0 wt %, for example between 5.6 wt % and 23.0 wt %, in particular between 5.6 wt % and 20.7 wt %.

The term "acid" is used herein to refer to one or more than one acid which can be added during the course of the inventive process. Any acid may be used in the process. Use is generally made of a mineral acid, such as sulfuric acid, nitric acid or hydrochloric acid, or of an organic acid, such as acetic acid, formic acid or carbonic acid. Sulfuric acid is preferred.

The acid may be metered into the reaction medium in diluted or concentrated form. The same acid at different concentrations may be used in different stages of the process.

At the end of the precipitation reaction, a suspension of precipitated silica is obtained, which is subsequently separated (liquid/solid separation). The process in all of its embodiments, thus typically comprises a further step of filtering the suspension of precipitated silica and drying the precipitated silica.

The separation usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step, the filter cake is in a flow able, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Optionally, the liquefaction step may be carried out by subjecting the filter cake to a chemical action, for instance by addition of water or an acid. The mechanical and chemical treatments may be both carried out.

The at least one compound (A) can be added to the filter cake before, during or after the liquefaction step. Typically, the at least one compound (A) is added to the filter cake during or after the liquefaction step. Compound (A) can be added either as a solid or as a liquid, dispersion or solution.

The liquefaction step may also comprise the addition to the filter cake of an aluminum compound.

The suspension of precipitated silica which is obtained after the liquefaction step is subsequently dried. Drying may be performed according to means known in the art. Preferably, the drying is performed by atomization.

Notable, non-limiting examples of suitable processes for the preparation of precipitated silica are disclosed for instance in EP396450A, EP520862A, EP647591A, EP670813A, EP670814A, EP901986A, EP762992A, EP762993A, EP917519A, EP983966A, EP1355856A, WO03/016215, WO2009/112458, WO2011/117400.

The amount of the at least one compound (A) added to the silica in the inventive process is such that, in the final product, the total content (C) of the at least one compound (A), expressed as total carbon, is of at least 0.1 wt %, in particular of at least 0.2 wt %. The content (C) of the at least one aromatic compound can be of at least 0.5 wt %, in particular of at least 1.0 wt %, for example of at least 2.0 wt %, indeed even of at least 2.5 wt %. The content (C) the at least one aromatic compound, expressed as total carbon is not particularly limited, although it typically does not exceed 20.0 wt %, in particular it does not exceed 15.0 wt %.

All definitions and preferences concerning the nature of the at least one compound (A) equally apply to the processes for the preparation of the modified silica of the invention.

The modified silica according to the present invention or obtained by the process according to the invention described above can be used in numerous applications.

The modified silica can be employed, for example, as catalyst support, in polymer, especially elastomer, compositions, as viscosifying, texturizing or anticaking agent, as battery separator component, or as additive for toothpaste, concrete or paper or feedstock.

The modified silica of the invention can be used in particular as filler for polymer compositions and in particular in elastomeric compositions. It has been found that the inventive silica allows improving the initial stages of the mixing process by reducing the tendency of the elastomeric mixture to break into crumbs or blocks and thus providing mixtures that are more homogeneous.

The polymer compositions in which it can be employed, in particular as reinforcing filler, are generally based on one or more polymers or copolymers, in particular on one or more elastomers, preferably exhibiting at least one glass transition temperature of between −150° C. and +300° C., for example between −150° C. and +20° C.

The expression "copolymer" is used herein to refer to polymers comprising recurring units deriving from at least two monomeric units of different nature.

Mention may in particular be made, as possible polymers, of diene polymers, in particular diene elastomers.

For example, use may be made of polymers or copolymers deriving from aliphatic or aromatic monomers, comprising at least one unsaturation (such as, in particular, ethylene, propylene, butadiene, isoprene, styrene, acrylonitrile, isobutylene or vinyl acetate), polybutyl acrylate, or their mixtures; mention may also be made of functionalized elastomers, that is elastomers functionalized by chemical groups positioned along the macromolecular chain and/or at one or more of its ends (for example by functional groups capable of reacting with the surface of the silica), and halogenated polymers. Mention may be made of polyamides, ethylene homo- and copolymers, propylene homo- and copolymers.

The polymer (copolymer) can be a bulk polymer (copolymer), a polymer (copolymer) latex or else a solution of polymer (copolymer) in water or in any other appropriate dispersing liquid.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or cross-linked, in particular with peroxides or other cross-linking systems (for example diamines or phenolic resins).

In general, the polymer compositions additionally comprise at least one (silica/polymer) coupling agent and/or at least one covering agent; they can also comprise, inter alia, an antioxidant.

Non-limiting examples of suitable coupling agents are for instance "symmetrical" or "unsymmetrical" silane polysulfides; mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-(trimethoxysilyl)propyl) polysulfides or bis (3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state or grafted at the surface of the silica. It is the same for the optional covering agent.

The proportion by weight of the modified silica in the polymer composition can vary within a fairly wide range. It normally represents from 10% to 200% by weight, in particular from 20% to 150% by weight, especially from 20% to 80% by weight (for example from 30% to 70% by weight) or from 80% to 120% by weight (for example from 90% to 110% by weight), of the amount of the polymer(s).

The modified silica according to the invention can advantageously constitute all of the reinforcing inorganic filler and even all of the reinforcing filler of the polymer composition.

However, the modified silica according to the invention can optionally be combined with at least one other reinforcing filler, such as, in particular, a commercial highly dispersible silica, such as, for example, Zeosil® Z1165MP or Zeosil® Z1115MP (commercially available from Solvay), a treated precipitated silica (for example, a precipitated silica "doped" using a cation, such as aluminum); another reinforcing inorganic filler, such as, for example, alumina, indeed even a reinforcing organic filler, in particular carbon black (optionally covered with an inorganic layer, for example of silica).

The compositions comprising the modified silica of the invention may be used for the manufacture of a number of articles. Non-limiting examples of finished articles comprising at least one of the polymer compositions described above are for instance of footwear soles, floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires, in particular tire treads (especially for light vehicles or for heavy-goods vehicles, e.g. trucks).

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Determination of Carbon Content

The content of carbon was measured using a carbon/sulfur analyzer, such as the Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron). The carbon present in the sample to be analyzed (weight of approximately 0.2 gram) combines with the oxygen to form $CO_2$, CO. These gases are subsequently analyzed by an infrared detector. The moisture from the sample and the water produced during these oxidation reactions is removed by passing over a cartridge comprising a dehydrating agent (magnesium perchlorate) in order not to interfere with the infrared measurement. The result is expressed as weight of element carbon per weight of $SiO_2$.

Example 1—Preparation of Modified Silica of the Invention

Modified precipitated silicas were prepared according to the following procedure.

Compound (A) was dissolved/dispersed in a volume of solvent equal to the porous volume of silica, and the resulting solution/suspension was added to silica while mixing with a spatula; the solvent was then removed under reduced pressure on a rotary evaporator. The experimental porous volume was measured by adding solvent to a precise mass of silica under mechanical stirring until it became slightly sticky (complete filling of the porous volume).

For each trial, 0.105 mmol of compound (A) was impregnated per g of silica. The amount of aromatic compound used is expressed in parts per hundred silica (phs) i.e. grams of aromatic compound per hundred grams of silica. In examples, S1-S4 the precipitated silica was Zeosil® Premium 200MP, commercially available from Solvay SA (having a BET surface area of 210 $m^2$/g). In example S5, the precipitated silica was Zeosil® 1165MP, commercially available from Solvay SA (having a BET surface area of 160 $m^2$/g).

Silica S1: Hydroxychavicol (5.68 g, 1.57 phs) was dissolved in toluene (655 mL) and the resulting solution was added to silica (360 g) while mixing with a spatula; toluene was then removed under reduced pressure on a rotary evaporator (50° C., 20 mbar) until the weight remained stable. 357 g of a white powder was obtained. Total carbon content: 1.2 wt %.

Silica S2: Guaiacol (4.69 g, 1.30 phs) was dissolved in toluene (655 mL) and the resulting solution was added to silica (360 g) while mixing with a spatula; toluene was then removed under reduced pressure on a rotary evaporator (50° C., 20 mbar) until the weight remained stable. 363 g of a white powder was obtained. Total carbon content: 0.9 wt %.

Silica S3: Eugenol (6.21 g, 1.73 phs) was dissolved in toluene (655 mL) and the resulting solution was added to silica (360 g) while mixing with a spatula; toluene was then removed under reduced pressure on a rotary evaporator (50° C., 20 mbar) until the weight remained stable. 357 g of a white powder was obtained. Total carbon content: 1.4 wt %.

Silica S4: 2,3-Dihydroxynaphthalene (6.05 g, 1.68 phs) was dissolved in a toluene/ethanol mixture (405 mL/250 mL) and the resulting solution was added to silica (360 g) while mixing with a spatula; the solvent mixture was then removed under reduced pressure on a rotary evaporator (50° C., 20 mbar) until the weight remained stable. 363 g of a white powder was obtained. Total carbon content: 1.4 wt %.

Silica S5: 4-tert-Butylcatechol (9.49 g, 1.13 phs) was dissolved in water (50 mL) at 35° C. under stirring. Using a two fluid nozzle and a pressure of 1 bar, the resulting solution was sprayed onto silica (840 g) for few seconds at ambient temperature under mechanical stirring in an impregnation tank. The stirring was maintained for 5 min in order to homogenize the mixture. The impregnated silica was allowed to dry at ambient temperature. Total carbon content: 0.9 wt %.

Examples 2 and 3 and Comparative Example 1

Silicas according to the invention were evaluated in solution SBR/BR matrix. The compositions, expressed as parts by weight per 100 parts of elastomers (phr), are described in Table1.

The process for the preparation of the rubber compositions was carried out in two successive preparation phases: a first phase of high-temperature thermomechanical working, followed by a second phase of mechanical working at temperatures of less than 110° C. to introduce the vulcanization system. The first phase was carried out using a mixing device, of internal mixer type, of Brabender brand (capacity of 380 mL).

In a first pass of the first phase, the elastomers and the reinforcing filler (introduction in instalments) were mixed with the coupling agent, the oil, the resin and the stearic acid. The duration was 4 min and the dropping temperature was about 140-155° C. After cooling the mixture (temperature of less than 100° C.), a second pass made it possible to incorporate the zinc oxide and the protecting agents/antioxidants and to pursue the silanization. The duration of this pass was 4 min and the dropping temperatures of approximately 150° C.

After cooling the mixture (temperature of less than 100° C.), the vulcanization system was added during the second phase. It was carried out on an open mill, preheated to 50° C. The duration of this phase was between 2 and 6 minutes. Each final mixture was subsequently calendered in the form of plaques with a thickness of 2-3 mm.

The visual aspect of the compounds after the first mixing pass in the internal mixer is reported in Table 2. The slope of the mixer torque during the last 60 s of the first mixing stage is also reported. A drop of the torque at this stage of mixing indicates a loss of cohesion of the mixture and correlates with the formation of crumbs or blocks.

TABLE 1

| Description | Comp. Example 1 | Example 2 | Example 3 |
|---|---|---|---|
| sSBR (1) | 110 | 110 | 110 |
| BR(2) | 20 | 20 | 20 |
| Zeosil ® Premium 200MP | 90 | | |
| S2 | | 91 | |
| S4 | | | 91 |
| Carbon black (N330) | 3.0 | 3.0 | 3.0 |
| TESPD (3) | 5.0 | 5.0 | 5.0 |
| Stearic acid | 2.0 | 2.0 | 2.0 |
| 6-PPD (4) | 1.9 | 1.9 | 1.9 |
| ZnO | 2.5 | 2.5 | 2.5 |
| TDAE oil (5) | 10 | 10 | 10 |

TABLE 1-continued

| Description | Comp. Example 1 | Example 2 | Example 3 |
|---|---|---|---|
| Resin(6) | 10 | 10 | 10 |
| Sulfur | 1.9 | 1.9 | 1.9 |
| DPG(7) | 1.7 | 1.7 | 1.7 |
| CBS(8) | 2.0 | 2.0 | 2.0 |

(1) Oil extended solution SBR, Buna VSL4526-2HM from Lanxess with 45% of vinyl units; 26% of styrene units; Tg of −30° C., 37.5 phr of TDAE
(2) BR: Butyl Rubber Buna CB 25 from Lanxess
(3) Bis[3-(triethoxysilyl)propyl]disulfide, Luvomaxx TESPD from Lehmann&Voss&Co
(4) 6-PPD: N-(1,3-Dimethylbutyl)-N-phenyl-para-phenylenediamine, Santoflex 6-PPD from Flexsys
(5) TDAE oil, Vivatec 500 from Hansen & Rosenthal KG
(6) Resin Dercolyte L120 from DRT
(7) DPG: Diphenylguanidine, Rhenogran DPG-80 from RheinChemie
(8) CBS: N-Cyclohexyl-2-benzothiazolesulfenamide, Rhenogran CBS-80 from RheinChemie Properties of the Vulcanisates The measurements were carried out after vulcanization at 160° C.

The Shore A hardness measurement of the vulcanisates were carried out according to the instructions of standard ASTM D 2240. The given value was measured at 3 seconds.

Uniaxial tensile tests were carried out in accordance with the instructions of the standard NF ISO 37 with test specimens of H2 type at a rate of 500 mm/min on an Instron 5564 device. The x % modulus, corresponding to the stress measured at x % of tensile strain, are and the tensile strength are expressed in MPa; elongation at break is expressed in MPa.

The values for loss factor (tan δ) and compressive dynamic complex modulus (E*) were recorded on vulcanized samples (cylindrical test specimen with a cross section of 95 mm$^2$ and a height of 14 mm). The sample was subjected to a prestrain at 10% sinusoidal deformation, and dynamic solicitation of 4%. Measurements were performed at 60° C. and 10 Hz frequency on a Metravib VA 3000.

TABLE 2

| | Comp. Example 1 | Example 2 | Example 3 |
|---|---|---|---|
| Aspect of the mixture after first pass in internal mixer | crumbs | small blocks | one cohesive mixture |
| Torque slope at the end of first mixing stage (Nm/min) | −47 | −27 | −11 |
| Shore A (pts) | 69 | 70 | 72 |
| Module 100 (MPa) | 3.3 | 2.8 | 3.3 |
| Module 300 (MPa) | 13.0 | 11.3 | 12.8 |
| Tensile strength (MPa) | 16.0 | 17.0 | 18.2 |
| Elongation at break (%) | 354 | 407 | 396 |
| E* (MPa) | 10.6 | 12.3 | 13.6 |
| Tan δ (nu) | 0.157 | 0.153 | 0.137 |

Example 4 and Comparative Example 2

The process for the preparation of the rubber compositions was carried out in two successive preparation phases: a first phase of high-temperature thermomechanical working, followed by a second phase of mechanical working at temperatures of less than 110° C. to introduce the vulcanization system.

The first phase was carried out using a mixing device, of internal mixer type, of Brabender brand (capacity of 380 mL). The initial temperature and the speed of the rotors were set so to achieve mixture dropping temperatures of 150-155° C. During the first phase the elastomers, the reinforcing fillers (introduction in instalments) were mixed with the coupling agent and the other additives (oil, stearic acid, resin, ZnO, 6-PPD). The duration was 5 min.

After cooling the mixture (temperature of less than 100° C.), the vulcanization system was added during the second phase. It was carried out on an open mill, preheated to 50° C. The duration of this phase was between 2 and 6 minutes. Each final mixture was subsequently calendered in the form of plaques with a thickness of 2-3 mm.

The visual aspect of the mixture after the first mixing pass in the mixer is reported in Table 4. The slope of the mixer torque during the last 60 s of the first mixing stage is also reported. A drop of the torque at this stage of mixing indicates a loss of cohesion of the mixture and correlates with the formation of crumbs or blocks.

TABLE 3

| Description | Comp. Example 2 | Example 4 |
|---|---|---|
| sSBR (1) | 110 | 110 |
| BR(2) | 20 | 20 |
| Zeosil ® Premium 200MP | 90 | |
| S4 | | 91 |
| Carbon black (N330) | 3.0 | 3.0 |
| TESPD (3) | 8.1 | 8.1 |
| Stearic acid | 2.0 | 2.0 |
| 6-PPD (4) | 1.9 | 1.9 |
| ZnO | 2.5 | 2.5 |
| TDAE oil (5) | 10 | 10 |
| Resin(6) | 10 | 10 |
| Sulfur | 1.9 | 1.9 |
| DPG(7) | 1.7 | 1.7 |
| CBS(8) | 2.0 | 2.0 |

(1) Oil extended solution SBR, Buna VSL4526-2HM from Lanxess with 45% of vinyl units; 26% of styrene units; Tg of −30° C., 37.5 phr of TDAE
(2) BR: Butyl Rubber Buna CB 25 from Lanxess
(3) Bis[3-(triethoxysilyl)propyl]disulfide, Luvomaxx TESPD from Lehmann&Voss&Co
(4) 6-PPD: N-(1,3-Dimethylbutyl)-N-phenyl-para-phenylenediamine, Santoflex 6-PPD from Flexsys
(5) TDAE oil, Vivatec 500 from Hansen & Rosenthal KG
(6) Resin Dercolyte L120 from DRT
(7) DPG: Diphenylguanidine, Rhenogran DPG-80 from RheinChemie
(8) CBS: N-Cyclohexyl-2-benzothiazolesulfenamide, Rhenogran CBS-80 from RheinChemie Mechanical Properties of the Vulcanisates The measurements were carried out after vulcanization at 160° C. Testing methods and conditions are detailed above. Results are reported in Table 4.

TABLE 4

| | Comp. Example 2 | Example 4 |
|---|---|---|
| Aspect of the mixture after first pass in internal mixer | crumbs and small block | one cohesive block |
| Torque slope at the end of first mixing stage (Nm/min) | −17 | −9 |
| Shore A (pts) | 70 | 71 |
| Module 100 (MPa) | 2.8 | 3.1 |
| Module 300 (MPa) | 10.6 | 11.6 |
| Tensile strength (MPa) | 18.0 | 19.1 |
| Elongation at break (%) | 447 | 441 |
| E* (MPa) | 9.5 | 10.6 |
| Tan δ (nu) | 0.160 | 0.159 |

The silicas according the invention allow an improvement of the cohesiveness of the silica/elastomer mixtures. Both the visual aspect and the less pronounced fall in the torque at the end of the mixing process correlate with a reduced tendency of the mixture to form crumbs.

The inventive silicas also provide an improvement in tensile strength and/or elongation at break with similar or better compromise between stiffness and dissipation at 60° C.

The invention claimed is:

1. A modified silica comprising at least one compound, compound (A), of formula (II) in an amount expressed as total carbon, of from 1.0 wt % to 20.0 wt %:

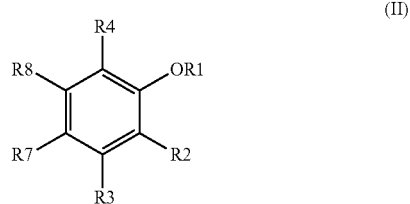

(II)

wherein:
R1 is selected from the group consisting of H and optionally substituted, saturated or partially unsaturated, C1-C5 hydrocarbon radicals;
R2 is —OR1;
R3 and each of R4 are selected, independently of each other, from the group consisting of H, —OR5, —CHO, =O, —COORS or R6; wherein R5 is selected from the group consisting of H, saturated or partially unsaturated C1-C75 hydrocarbon radicals, optionally substituted with heteroatoms selected from halogen, P, S, N, O and Si, or which can be fused together to form one or more aromatic or aliphatic cycle, and R6 is selected from the group of optionally substituted, saturated or partially unsaturated, C1-C75 hydrocarbon radicals, optionally substituted with heteroatoms selected from halogen, P, S, N, O and Si, or which can be fused together to form one or more aromatic or aliphatic cycle; —SO$_3$X, wherein X is H, Na, or K;
and
R7 and R8 are selected, independently of each other, from the group consisting of optionally substituted, saturated or partially unsaturated, C1-C75 hydrocarbon radicals, optionally substituted with heteroatoms selected from halogen, P, S, N, O and Si, and R7 and R8 are fused together to form one or more aromatic cycle.

2. The modified silica according to claim 1, wherein the compound (A) is 2,3-dihydroxynaphthalene.

3. The modified silica according to claim 1, wherein the amount of the compound (A), expressed as total carbon, is from 1.2 wt % to 20.0 wt %.

4. The modified silica of claim 1, wherein the modified silica has a BET surface area of at most 550 m$^2$/g, as determined according to standard NF ISO 5794-1, Appendix D (June 2010).

5. The modified silica according to claim 4, wherein the modified silica has a BET surface area of at most 370 m$^2$/g.

6. The modified silica according to claim 4, wherein the modified silica has a BET surface area between 50 m$^2$/g and 350 m$^2$/g.

7. The modified silica according to claim 4, which is a precipitated silica.

8. A modified silica consisting of a precipitated silica and of a modifier, said modifier consisting of at least one compound, compound (A), of formula (II) in an amount expressed as total carbon, from 0.1 wt % to 20.0 wt %:

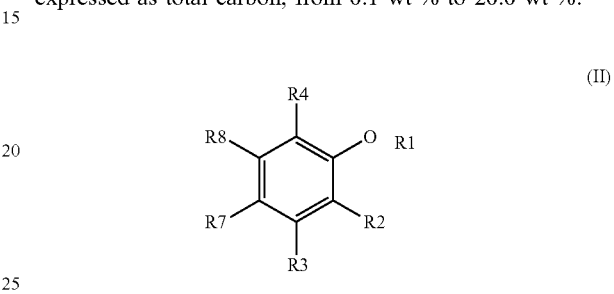

(II)

wherein:
R1 is selected from the group consisting of H and optionally substituted, saturated or partially unsaturated, C1-C5 hydrocarbon radicals;
R2 is selected from the group consisting of —R1, —COOH, —COOR1, —OR1;
R3 and each of R4 are selected, independently of each other, from the group consisting of H, —OR5, —CHO, —O, —COOR5 or R6; wherein R5 is selected from the group consisting of H, saturated or partially unsaturated C1-C75 hydrocarbon radicals, optionally substituted with heteroatoms selected from halogen, P, S, N, O and Si, or which can be fused together to form one or more aromatic or aliphatic cycle, and R6 is selected from the group of optionally substituted, saturated or partially unsaturated, C1-C75 hydrocarbon radicals, optionally substituted with heteroatoms selected from halogen, P, S, N, O and Si, or which can be fused together to form one or more aromatic or aliphatic cycle; —SO$_3$X, wherein X is H, Na, or K; and
R7 and R8 are selected, independently of each other, from the group consisting of optionally substituted, saturated or partially unsaturated, C1-C75 hydrocarbon radicals, optionally substituted with heteroatoms selected from halogen, P, S, N, O and Si, and R7 and R8 are fused together to form one or more aromatic cycle.

9. The modified silica according to claim 8, wherein the compound (A) is 2,3-dihydroxynaphthalene.

* * * * *